United States Patent
Shah et al.

(10) Patent No.: US 7,583,839 B2
(45) Date of Patent: Sep. 1, 2009

(54) METHOD AND MECHANISM FOR ANALYZING THE TEXTURE OF A DIGITAL IMAGE

(75) Inventors: Shesha Shah, Bilekahalli (IN); Sriram J. Sathish, Benson Town (IN)

(73) Assignee: Yahoo! Inc., Sunnyvale, CA (US)

( * ) Notice: Subject to any disclaimer, the term of this patent is extended or adjusted under 35 U.S.C. 154(b) by 556 days.

(21) Appl. No.: 11/316,728

(22) Filed: Dec. 22, 2005

(65) Prior Publication Data

US 2007/0098259 A1    May 3, 2007

(30) Foreign Application Priority Data

Oct. 31, 2005   (IN)   ............... 2916/2005

(51) Int. Cl.
*G06K 9/00*   (2006.01)
(52) U.S. Cl. .............. 382/168; 382/162; 382/170
(58) Field of Classification Search .......... 382/162, 382/168, 169, 170, 305, 199, 260, 263, 266
See application file for complete search history.

(56) References Cited

U.S. PATENT DOCUMENTS

| | | | |
|---|---|---|---|
| 5,633,511 A | 5/1997 | Lee et al. | |
| 6,178,439 B1 | 1/2001 | Feit | |
| 6,308,212 B1 | 10/2001 | Besaw et al. | |
| 6,751,348 B2 | 6/2004 | Buzuloiu et al. | |
| 6,904,560 B1 | 6/2005 | Panda | |
| 6,963,663 B1 | 11/2005 | Yoshida | |
| 7,027,645 B2 | 4/2006 | Swift | |
| 7,039,255 B2* | 5/2006 | Lee et al. ............... | 382/305 |
| 7,046,865 B2* | 5/2006 | Kasutani ............... | 382/305 |
| 7,333,655 B1 | 2/2008 | Swift et al. | |
| 7,502,835 B1 | 3/2009 | Cheng | |
| 2005/0086254 A1 | 4/2005 | Zou et al. | |
| 2007/0076950 A1 | 4/2007 | Shah | |
| 2007/0098257 A1 | 5/2007 | Shah | |

OTHER PUBLICATIONS

Manjunath, B.S., et al., "A texture descriptor for browsing and similarity retrieval," Journal of Signal Processing Communication, vol. 16, No. 1-2, Sep. 2000, pp. 33-43.

(Continued)

*Primary Examiner*—Phuoc Tran
(74) *Attorney, Agent, or Firm*—Hickman Palermo Truong & Becker LLP; Edward A. Becker

(57) ABSTRACT

A method and apparatus for comparing content attributes, e.g., texture, of one digital image a second digital image. An image operation is performed on gray scale image data to identify intensity transitions of a first digital image. The gray scale image data comprises a set of data values that each identifies a gray scale value. For at least a subset of the set of data values, a slope value for an intensity transition associated with the data value is determined. The slope values are converted to possible slope values of a bounded set of possible slope values. First slope data that describes a frequency of occurrence, across the subset of data values, of each possible slope value is generated. The first slope data is compared to second slope data associated with the second digital image to determine how similar the first digital image is to the second digital image.

27 Claims, 10 Drawing Sheets

OTHER PUBLICATIONS

Portilla, Javier, et al., "Representation and Synthesis of Visual Texture," New York University, Center for Neural Science, Retreived from http://www.cns.nyu.edu/~lcv/texture/, retrieved on Jan. 20, 2006, pp. 1-4.

Wang, Chong-Jun, et al., "Image Texture Representation and Retrieval Based on Power Spectral Histograms", Proceedings of the 16*th* IEEEE International Conference on ICTAI 2004, pp. 491-495.

Arentz, W. et al., "Classifying offensive sites based on image content," Computer Vision and Image Understanding 94 (2004) pp. 295-310.

Jones, M. et al., "Statistical Color Models with Application to Skin Detection" Dec. 1998, pp. 1-28.

Solar, R. et al., "Characterizing Objectionable Image Content (Pornography and Nude Images) of specific Web Segments: Chile as a case study" *IEEE*, Publication Date: Oct. 31-Nov. 2, 2005, pp. 1-11.

S. Mukherjea et al., "Towards a multimedia World-Wide Web Information retrieval engine", Computer Networks and ISDN Systems, 29, published 1997, p. 1181 - 1191.

"Oracle8i Visual Information Retrieval User's Guide and Reference Release 8.1.5, A67293-01", URL: http://www.csee.umbc,edu/help/oracle8/inter.815/a67293/vir_cbr.htm, p. 1-19, published Jan. 28, 2002.

Alameida Souza Coelho et al. "Image Retrieval Using Multiple Evidence Ranking", IEEE Transactions on Knowledge and Data Engineering, vol. 16, No. 4, Apr. 2004, pp. 408-417.

Wei-Hao Lin et al., "Web Image Retrieval Re-Ranking with Relevance Model", Proceedings of the IEEE/WIC International Conference on Web Intelligence (WI'03), published 2003, pp. 1-7.

\* cited by examiner

FIG. 5
ORIGINAL IMAGE
PLURALITY OF IMAGE REGIONS
FOR ORIGINAL IMAGE
500

FIG. 7A
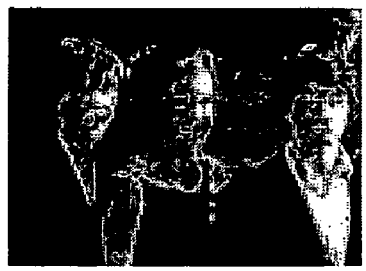
GRAY SCALE IMAGE A
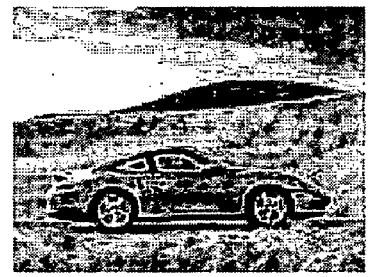
GRAY SCALE IMAGE B
FIG. 7B
GRAY SCALE IMAGE A
AFTER THE PERFORMANCE
OF STEP 620
GRAY SCALE IMAGE B
AFTER THE PERFORMANCE
OF STEP 620

FIG. 7C

SLOPE DATA FOR IMAGE A 334.0000:325.0000:291.0000:222.0000:400.0000:335.0000:374.0000:370.0000:573.0000:392.0000:414.0000:
631.0000:248.0000:284.0000:214.0000:185.0000:204.0000:160.0000:186.0000:148.0000:443.0000:255.0000:
272.0000:289.0000:391.0000:292.0000:281.0000:277.0000:249.0000:192.0000:199.0000:230.0000

SLOPE DATA FOR IMAGE B 2224.0000:784.0000:463.0000:314.0000:273.0000:392.0000:178.0000:179.0000:90.0000:166.0000:154.0000:166.0000:
377.0000:200.0000:314.0000:430.0000:559.0000:950.0000:561.0000:510.0000:331.0000:466.0000:239.0000:
196.0000:119.0000:210.0000:173.0000:211.0000:368.0000:397.0000:728.0000:1323.0000:969.0000

FIG. 7D

NORMALIZED SLOPE DATA FOR IMAGE A

:0.0346:0.0336:0.0301:0.0230:0.0414:0.0347:0.0387:0.0383:0.0593:0.0406:0.0429:0.0653:0.0257:0.0294:0.0222:
0.0192:0.0211:0.0166:0.0193:0.0153:0.0459:0.0264:0.0282:0.0299:0.0405:0.0302:0.0291:0.0287:0.0258:0.0199:
0.0206:0.0238

NORMALIZED SLOPE DATA FOR IMAGE B 0.1513:0.0533:0.0315:0.0186:0.0267:0.0121:0.0122:0.0061:0.0113:0.0105:0.0113:0.0256:0.0136:0.0214:0.0293:
0.0380:0.0646:0.0382:0.0347:0.0225:0.0317:0.0163:0.0133:0.0081:0.0143:0.0118:0.0144:0.0250:0.0270:0.0495:
0.0900:0.0659

METHOD AND MECHANISM FOR ANALYZING THE TEXTURE OF A DIGITAL IMAGE

RELATED APPLICATION DATA

This application is related to and claims the benefit of priority from Indian Patent Application No. 2916/DEL/2005, entitled "Method And Mechanism For Analyzing the Texture of a Digital Image," filed Oct. 31, 2005 , the entire disclosure of which is incorporate by reference as if fully set forth herein.

This application is related to Indian Patent Application No. 2918/DEL/2005entitled "Method And Mechanism For Retrieving Images," filed Oct. 31, 2005 the entire disclosure of which is incorporate by reference as if fully set forth herein.

This application is related to U.S. patent application Ser. No. 11/317,952, entitled "Method And Mechanism for Retrieving Images," filed concurrently herewith, the entire disclosure of which is incorporate by reference as if fully set forth herein.

This application is related to Indian Patent Application No. 897/KOL/2005, entitled "Method And Mechanism For Processing Image Data," filed Sep. 28, 2005 the entire disclosure of which is incorporate by reference as if fully set forth herein.

This application is related to U.S. patent application Ser. No. 11/219,183, entitled "Method And Mechanism for Processing Image Data," filed Nov. 30, 2005, the entire disclosure of which is incorporate by reference as if fully set forth herein.

This application is related to Indian Patent Application No. 2917/DEL/2005, entitled "Method And Mechanism for Analyzing the Color of a Digital Image," filed Oct. 31, 2005, the entire disclosure of which is incorporate by reference as if fully set forth herein.

This application is related to U.S. patent application Ser. No. 11/316,828, entitled "Method And Mechanism for Analyzing the Color of a Digital Image," filed concurrently herewith, the entire disclosure of which is incorporate by reference as if fully set forth herein.

FIELD OF THE INVENTION

The present invention relates to analyzing the content attributes, e.g., texture, of a digital image.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Image retrieval systems allow users to use a client to retrieve a set of digital images that match a set of search criteria. For example, many websites allow a user to submit one or more keywords to a server. The keywords are processed by the server to determine a set of images that are associated with the submitted keywords. The server may then display the matching set of images, to the user, on a subsequent webpage.

Certain image retrieval systems may also allow a user to select a digital image. The user may then cause the image retrieval system to retrieve a set of digital images with a visual appearance similar to that of the selected digital image. For example, a user may view a webpage with a several digital images displayed thereon. The user may select a digital image of a giraffe on the webpage. In response, the server may retrieve a set of digital images whose visual appearance is similar to that of the selected digital image of the giraffe, and thereafter display those similar looking digital images on a subsequent webpage.

Unfortunately, current techniques in the art for retrieving a set of digital images that match a set of search criteria are not very accurate. Thus, approaches for improving the accuracy in retrieving a set of digital images that match a set of search criteria are desirable.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 5 is a diagram illustrating an original digital image and a plurality of image regions determined for the original digital image according to an embodiment of the invention;

FIG. 7A is an illustration of gray scale digital images according to an embodiment of the invention;

FIG. 7B is an illustration of gray scale digital images, corresponding to the gray scale digital images depicted in FIG. 7A, having edge operation performed thereon according to an embodiment of the invention;

FIG. 7C is an illustration of slope data for the gray scale digital images of FIG. 7A according to an embodiment of the invention;

FIG. 7D is an illustration of normalized slope data for the gray scale digital images of FIG. 7A according to an embodiment of the invention.

DETAILED DESCRIPTION

In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Functional Overview

Techniques are discussed herein for comparing the content attributes of one image to the content attributes of a second image. For example, two or more digital images may be compared based on the texture depicted in the digital images. According to an embodiment, an image operation is performed on gray scale image data to identify intensity transitions of a first digital image. The gray scale image data is a digital representation of a gray scale version of the first digital image. The gray scale image data comprises a set of data values. Each data values identifies a gray scale value of a sequence of gray scale values.

For at least a subset of the data values of the gray scale image data, a slope value for an intensity transition associated with the data value is determined. The slope value is converted to a possible slope value of a bounded set of possible slope values. Thereafter, first slope data, for the first digital image, is determined. The first slope data describes a frequency of occurrence, across the subset of data values, of each possible slope value. The first slope data may be analyzed to determine the texture of the first digital image. For example, the first slope data may be analyzed to determine if the first slope data reflects characteristics indicative of a particular type of terrain or type of crop. Alternatively, the first slope data may be compared against a one or more others sets of slope data to determine the relatively similarity between the content attributes e.g., texture, of the first digital image to the content attributes of one or more other digital images.

Having described a high level approach of one embodiment of the invention, a description of the architecture of an embodiment shall be presented below.

Architecture Overview

Figure 1:
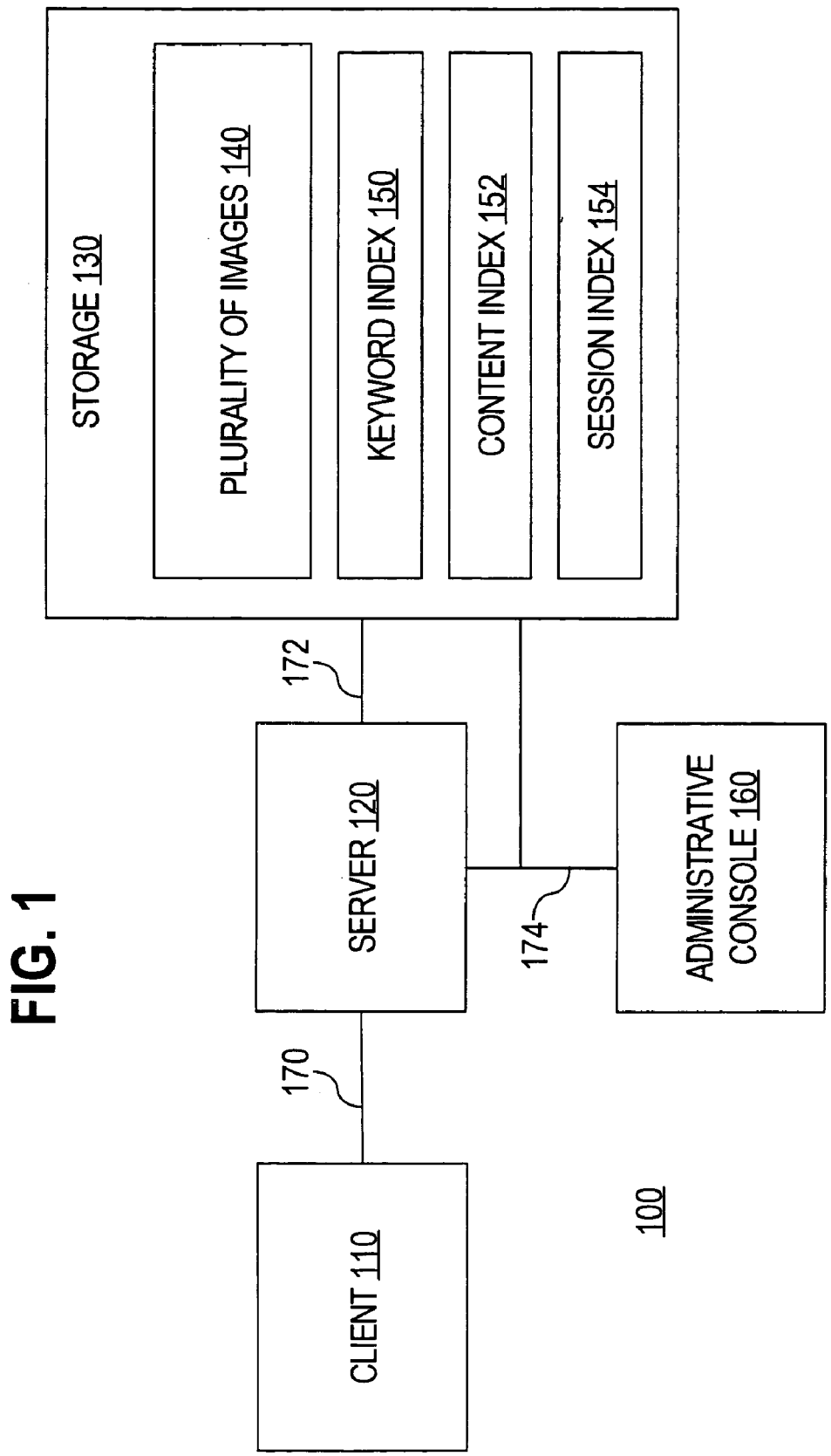
FIG. 1 is a block diagram of a system according to an embodiment of the invention.

FIG. 1 is a block diagram of a system 100 according to an embodiment of the invention. Embodiments of system 100 may be used to retrieve requested digital images that satisfy search criteria specified by a user. A user may specify a variety of different search criteria, e.g., a user may specify search criteria that requests the retrieval of digital images that (a) are associated with a set of keywords, and (b) are similar to a base image. As explained below, if the search criteria references a base image, some embodiments of system 100 may also consider which digital images were viewed together with the base image by users in a single session when retrieving the requested digital images.

In the embodiment depicted in FIG. 1, system 100 includes client 110, server 120, storage 130, a plurality of images 140, keyword index 150, a content index 152, a session index 154, and an administrative console 160. While client 110, server 120, storage 130, and administrative console 160 are each depicted in FIG. 1 as separate entities, in other embodiments of the invention, two or more of client 110, server 120, storage 130, and administrative console 160 may be implemented on the same computer system. Also, other embodiments of the invention (not depicted in FIG. 1), may lack one or more components depicted in FIG. 1, e.g., certain embodiments may not have a administrative console 160, may lack a session index 154, or may combine one or more of the keyword index 150, the content index 152, and the session index 154 into a single index.

Client 110 may be implemented by any medium or mechanism that provides for sending request data, over communications link 170, to server 120. Request data specifies a request for one or more requested images that satisfy a set of search criteria. For example, request data may specify a request for one or more requested images that are each (a) associated with one or more keywords, and (b) are similar to that of the base image referenced in the request data. The request data may specify a request to retrieve a set of images within the plurality of images 140, stored in or accessible to storage 130, which each satisfy a set of search criteria. The server, after processing the request data, will transmit to client 110 response data that identifies the one or more requested images. In this way, a user may use client 110 to retrieve digital images that match search criteria specified by the user. While only one client 110 is depicted in FIG. 1, other embodiments may employ two or more clients 110, each operationally connected to server 120 via communications link 170, in system 100. Non-limiting, illustrative examples of client 110 include a web browser, a wireless device, a cell phone, a personal computer, a personal digital assistant (PDA), and a software application.

Server 120 may be implemented by any medium or mechanism that provides for receiving request data from client 110, processing the request data, and transmitting response data that identifies the one or more requested images to client 110.

Storage 130 may be implemented by any medium or mechanism that provides for storing data. Non-limiting, illustrative examples of storage 130 include volatile memory, non-volatile memory, a database, a database management system (DBMS), a file server, flash memory, and a hard disk drive (HDD). In the embodiment depicted in FIG. 1, storage 130 stores the plurality of images 140, keyword index 150, content index 152, and session index 154. In other embodiments (not depicted in FIG. 1), the plurality of images 140, keyword index 150, content index 152, and session index 154 may be stored across two or more separate locations, such as two or more storages 130.

Plurality of images 140 represent images that the client 110 may request to view or obtain. Keyword index 150 is an index that may be used to determine which digital images, of a plurality of digital images, are associated with a particular keyword. Content index 152 is an index that may be used to determine which digital images, of a plurality of digital images, are similar to that of a base image. A base image, identified in the request data, may or may not be a member of the plurality of images 140. Session index 154 is an index that may be used to determine which digital images, of a plurality of digital images, were viewed together with the base image by users in a single session.

Administrative console 160 may be implemented by any medium or mechanism for performing administrative activities in system 100. For example, in an embodiment, administrative console 160 presents an interface to an administrator, which the administrator may use to add digital images to the plurality of images 140, remove digital images from the plurality of images 140, create an index (such as keyword index 150, content index 152, or session index 154) on storage 130, or configure the operation of server 120.

Communications link 170 may be implemented by any medium or mechanism that provides for the exchange of data between client 110 and server 120. Communications link 172 may be implemented by any medium or mechanism that provides for the exchange of data between server 120 and storage 130. Communications link 174 may be implemented by any medium or mechanism that provides for the exchange of data between administrative console 160, server 120, and storage 130. Examples of communications links 170, 172, and 174 include, without limitation, a network such as a Local Area Network (LAN), Wide Area Network (WAN), Ethernet or the Internet, or one or more terrestrial, satellite or wireless links.

Having provided a description of the architecture of an illustrative embodiment, several use cases for using system 100 shall now be discussed.

Use Cases

To facilitate the explanation of embodiments of the invention, several illustrative use cases for employing system 100 shall be described. The uses of system 100 described in this section are intended to assist the reader in gaining an understanding of how embodiments of the invention may be employed, rather than limiting the scope of embodiments to the exemplary uses discussed herein.

In an embodiment (denoted "the keyword/image submission approach"), a user may use client 110 to submit request data to server 120 that requests one or more requested digital images, from the plurality of images 140, that are associated with the one or more keywords and which are similar to the base image. Server 120 may process the request data using the keyword index 150 and the content index 152, and thereafter transmit, to client 110, response data that identifies the one or more requested images.

One way in which a first image may be similar to a second image is for the first image to have a visual appearance that is similar to that of the second image. Of course, the visual appearance of an image depends upon user perception, which can be subjective. Also, certain content attributes of a digital image may not be visible, e.g., a watermark or a creation date. Thus, system 100 may be used to retrieve one or more requested images, from a storage 130, that have a similar visual appearance to the base image based on a comparison of the content attributes of the base image to the content attributes of images stored in the storage 130; however, other embodiments of the invention may be used to retrieve one or more requested images, from the storage 130, that are similar to the base image in certain respects based on a comparison of the content attributes, but otherwise may not look similar to the viewer.

In another embodiment (denoted "the image submission approach"), a user may use client 110 to submit request data to server 120 that requests one or more requested digital images, from the plurality of images 140, that are similar to a base image identified by the request data. Unlike the keyword/image submission approach, request data in the image submission approach does not identify any keywords. As a result, the server 120 may process the request data using the content index 152, and thereafter transmit, to client 110, response data that identifies the one or more requested images.

In an embodiment of the image submission approach, server 120 may identify keywords associated with the base image from the session index 154. For example, the server 120 may consult an entry of the session index 154 that is associated with the base image, and thereafter obtain a list of one or more keywords that are associated with the base image. The one or more keywords may be associated by the session index 154 to the base images based on a keyword associated with a session where the user viewed the base image. In such an embodiment of the image submission approach, the server 120 may use the keywords, obtained from the session index 154, in processing the request for digital images.

In an embodiment of the image submission approach, server 120 stores keyword data in storage 130. The keyword data associates keywords with at least a portion of the plurality of images 140. In this embodiment, when server 120 receives a request from client 110 that identifies a base image, but does not identify any keywords, the server 120 determines one or more keywords associated with the base image based on the keyword data stored in storage 130. In this way, the server 120 can determine its own set of keywords to use in processing the request, even though the request did not contain any keywords. In such an embodiment, the server 120 may process the request data using the keyword index 150 and the content index 152, and thereafter transmit, to client 110, response data that identifies the one or more requested images.

In another embodiment (denoted "the session information" approach), information (denoted session information) about what digital images users of system 100 viewed together in a single session, such as a TCP/IP session, may be used by the server 120 in processing request data received from client 110. To consider the session information, the server 120 may use the session index 154 in processing the request data. The session information approach may be used to augment either the keyword/image approach or the image submission approach. Additional information about how to generate and use the session index will be described below.

In embodiments of the invention, the client 110 may be a web browser. The user may submit the request data to the server 120 using a web page displayed by the web browser. The server 120, in turn, may transmit the response data to the client 110 in a web page displayed by the web browser.

In another embodiment of the invention, the client 110 may be a cell phone or wireless device. The user may submit the request data to the server 120 using the cell phone or wireless computer, and may subsequently receive response data, from the server 120, in the cell phone or wireless device.

Having described several non-limiting, illustrative use cases involving system 100, the creating of the indexes used by embodiments of system 100 in retrieving digital images shall be described in greater detail below.

Generating and Use of the Keyword Index

The server 120 may access the keyword index 150 to determine which of the plurality of images 140 are associated with a particular keyword. In an embodiment, the keyword index 150 comprises a plurality of entries. Each entry of the keyword index 150 is associated with a particular keyword. An entry of the keyword index 150 identifies those digital images, in the plurality of images 140, which are associated with the keyword associated with that entry.

To illustrate, assume the keyword index 150 contains an entry associated with the keyword "giraffe." The determine which of the plurality of images 140 are associated with the keyword "giraffe," the server 120 access the keyword index 150, and finds the entry of the keyword index 150 that is associated with the keyword "giraffe." That entry identifies the one or more images, within the plurality of images 140, that are associated with the keyword "giraffe."

In an embodiment of the invention, server 120 may access the keyword index 150 to find an entry of keyword index 150 associated with (a) an alternate spelling of a keyword identified in the request data, (b) a homonym of a keyword identified in the request data, (c) a synonym of a keyword identified in the request data, (d) one or more words which are related to the keyword identified in the request data. Thus, embodiments of the invention may use the one or more keywords identified in the request data as a basis for determining a "suggested" set of keywords as described above. The server 120 may use the suggested set of keywords, generated by the server 120, in the process of determining the one or more potential images. For example, the server 120 may include, in the set of one or more potential images, any image identified by the keyword index 150 by misspelling, homonym, or synonym of a keyword identified in the request data.

Keyword index 150 may be generated using techniques known to those in the art, such as, but not limited to, using the term frequency-inverse document frequency (tf-idf) weight of the keyword in construction of the keyword index 150. In an embodiment, keywords from all kinds of metadata may be used in generating the keyword index, e.g., web page title words and image file name words, to name a few. In an embodiment, whenever a new image is added to the plurality of images 140, the keyword index 150 is updated to reflect the newly added image.

Generating and Use of the Content Index

The server 120 may access the content index 152 to determine which of the plurality of images 140 are similar to the base image identified in the request data. In an embodiment, the content index 152 comprises a plurality of entities. Each entry of the content index 152 is associated with a particular image in the plurality of images 140. An entry of the content index 152 contains image description data that reflects one or more content attributes of the particular image associated with the entry. The server 120 may compare content data that reflects content attributes of the base image to the image description data associated with each entry to determine which entries, of the content index 152, have image description data that reflects content attributes similar to the content attributes of the base image. Once the server 120 determines which entries of the content index 152 have image description data that reflects similar content attributes to that of the base image, the server 120 identifies the images, of the plurality of images 140, which are associated with those entries of the content index 152, thereby identifying the images, of the plurality of images 140, which have a similar visual appearance to the base image.

Figure 2:
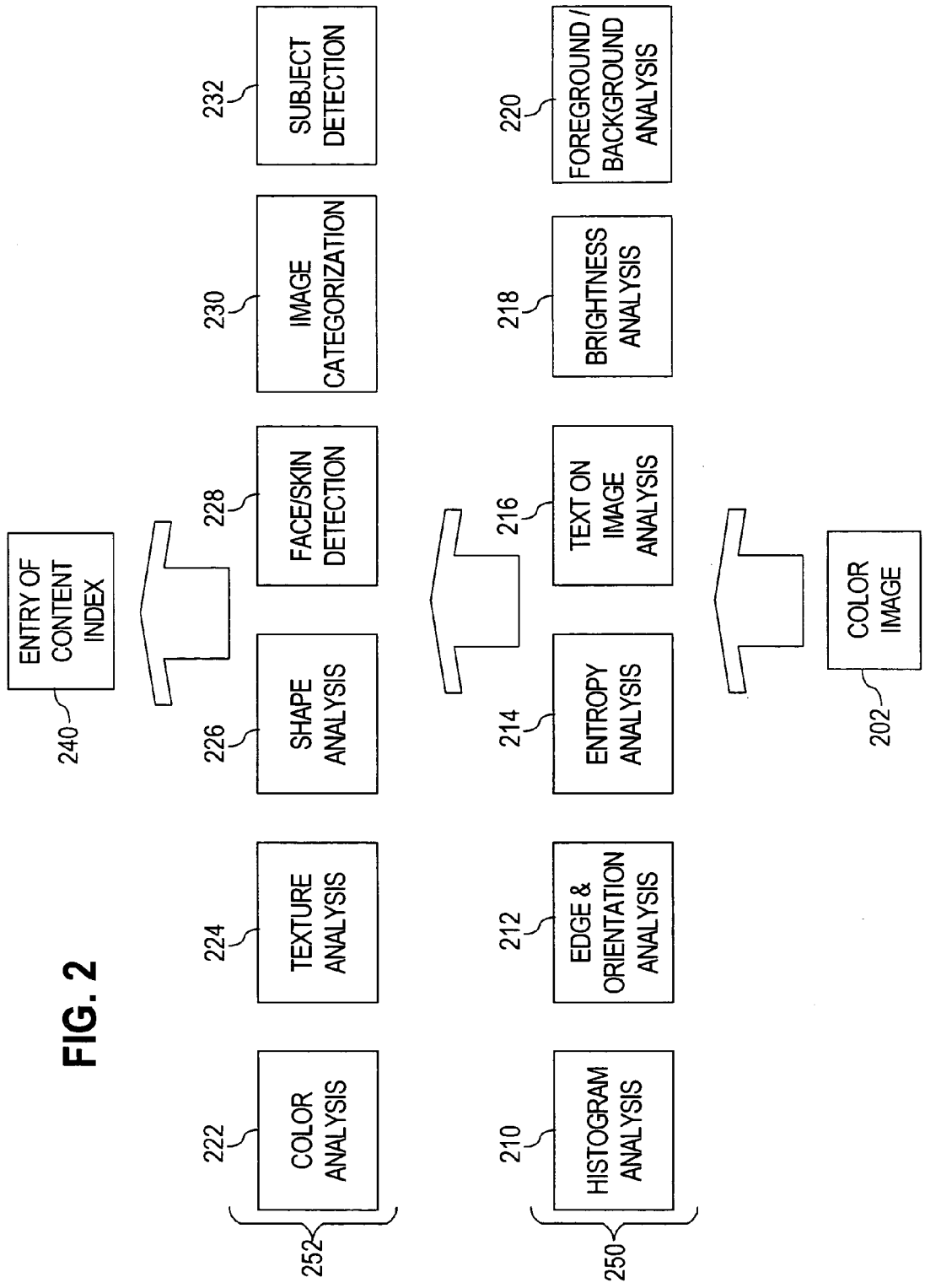
FIG. 2 is a diagram illustrating an approach for generating the context index according to an embodiment of the invention.

FIG. 2 is a diagram illustrating an approach for generating the context index 152 according to an embodiment of the invention. As shown in FIG. 2, an entry of the content index 240 is created by performing image operations on a digital image, such as color image 202 in FIG. 2. The purpose of performing the image operations on color image 202 is to generate data (denoted image description data) that reflects the content attributes of the color image 202. The image description data is used to construct an entry of the content index 152. In this way, once the server 120 analyzes a base image, referenced by request data, to determine content data describing the content attributes (such as information about the distribution of color and texture) of the base image, the server 120 can access the content index 152 to determine other images in the plurality of images 140 that have similar content attributes, and thereby are similar in visual appearance.

According to an embodiment, to generate an entry of the content index 152, image operations are performed on the color image 202 to generate image description data describing content attributes of the color image 202. As shown in FIG. 2, certain image operations may be referred to as "lower level" image operations 250, because the image operations are performed directed on the color image 202. Other image operations, referred to as "higher level" image operations 252, are performed upon the output of the lower level image operations 250. The result of performing either the lower level image operations 250 or the higher level image operations 252 may be used in generating the image description data for the entry of the content index 152 associated with the color image 202. Typically, entries of the content index 152 will reflect the content attributes of two or more image operations, e.g., the same entry of the content index 152 may reflect the content attributes of color image 202 produced by color analysis 222 and texture analysis 224 (as well as one or more other image operations). Techniques are known in the art for generating a content index entry based upon image operations.

The number and nature of the image operations performed on color image 202 used in the generation of an entry in the content index 152 may vary, as the number and nature of image operations depicted in FIG. 2 are merely exemplary. In an embodiment, the types of lower level image operations 250 that may be performed include histogram analysis 210, edge and orientation analysis 212, entropy analysis 214, text on image analysis 216, brightness analysis 218, and foreground/background analysis 220. Each the lower level image operations 250 are known to those in the art.

In an embodiment, the types of higher level image operations 252 that may be performed include color analysis 222, texture analysis 224, shape analysis 226, face/skin detection 228, image categorization 240, and subject detection 232. The performance of several of the higher level image operations 252, such as color analysis 222 and texture analysis 224 shall be described in further detail below. Techniques for performing certain higher level image operations 252 are known to those in the art. Thus, any of the techniques for performing higher level image operations 252, including those described below for describing the color attributes or texture attributes of a digital image, may be used in creating an entry of the content index 152 for a digital image.

Generating and Using the Session Index

The server 120 may access the session index 154 to determine which of the plurality of images 140 was viewed, together with the base image, by users in the same session. The session may be a TCP/IP session. Alternately, the session may be any other session which client 110 may maintain with any component of system 100, such as an application level session.

In an embodiment, the session index 154 comprises a plurality of entities. Each entry of the session index 154 is associated with a particular image in the plurality of images 140. An entry of the session index 154 contains session data. The session data indicates other images that viewed were together with a particular image (the image associated with the entry of the session index 154) by users during a single session of a specified duration. In an embodiment, the specified duration may extend over the entire duration of the session. In another embodiment, the specified duration may be a configurable length of time, e.g., a user may use administrative console 160 to configure the specified duration to be 30 minutes. Thus, after a session has been established longer than 30 minutes, all activity performed in that session is considered to be performed in a new session. In yet another embodiment, the specified duration may terminate when the user submits a new request containing response data to the server 120. These approaches are not mutually exclusive, e.g., an embodiment of system 100 may employ a session index 154 that uses session data that reflects the activity of users in a session for either a duration of time or until the user submits a new request.

In an embodiment, the session data associated with each entry of the session index 154 may be established by reviewing information about the images users of system 100 viewed in a single session. For example, logs (referred to as "click logs") that record the activity of users while using system 100 may be used to determine which images users viewed in a single session. The click logs may be used to generate the session data referenced by entries of session index 154. Updating the session index 154 may be necessary to account for new information in the click logs when such information in the click logs becomes available. Updating the session index 154 reflect new information in the click logs advantageously allows the session index 154 to employ the new information in the click logs; consequently, in an embodiment, the session index 154 may be updated more frequently than other indexes.

Retrieving Digital Images Using the System

Figure 3:
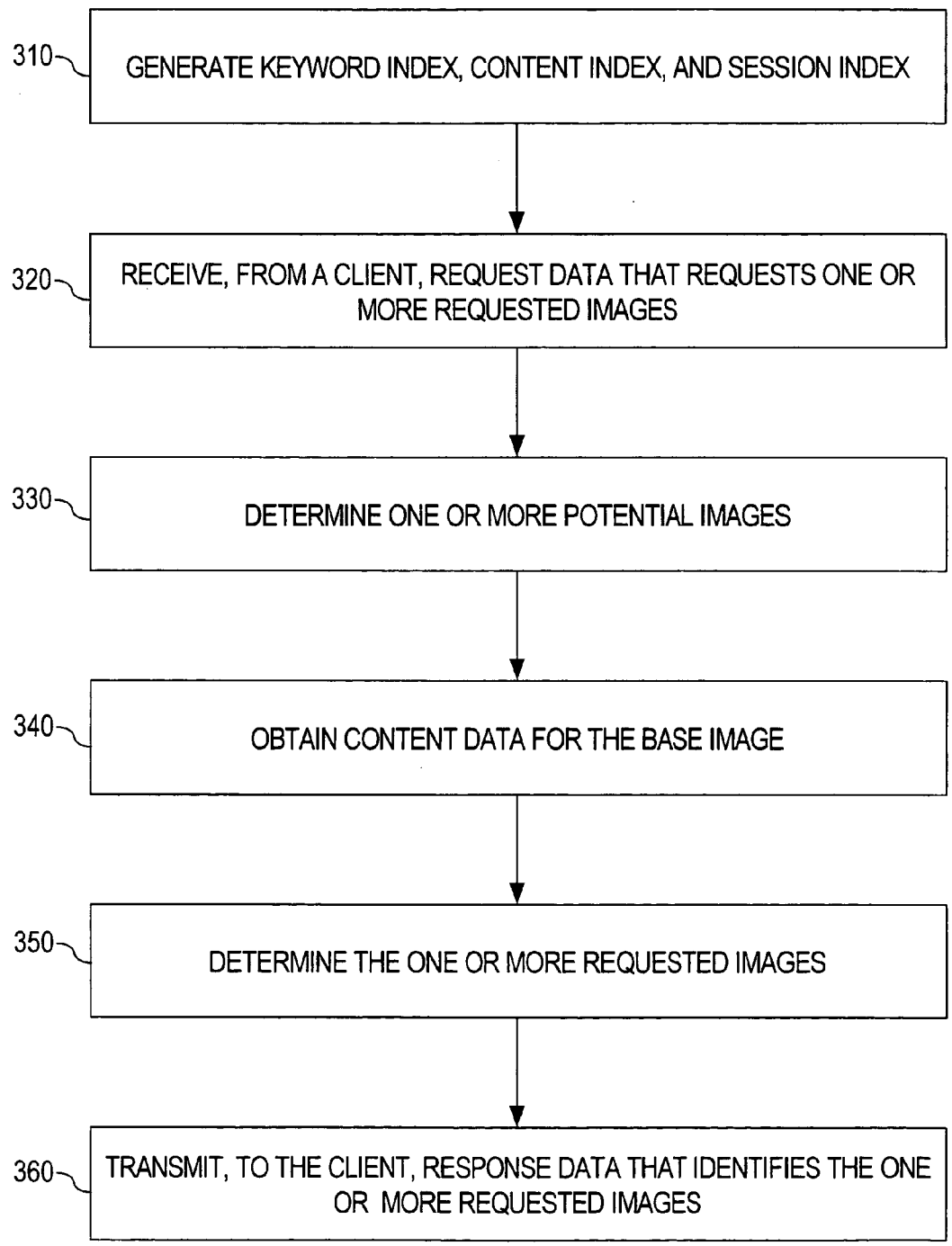
FIG. 3 is a flowchart illustrating the functional steps of retrieving digital images according to an embodiment of the invention.

FIG. 3 is a flowchart illustrating the functional steps of retrieving digital images according to an embodiment of the invention. While the steps of FIG. 3 shall be explained below in the order depicted in FIG. 3, other embodiments of the invention may perform certain steps of FIG. 3 in a different order than that depicted in FIG. 3, e.g., step 340 may be performed prior or in parallel to step 330.

Initially, in step 310, the keyword index 150, content index 152, and session index 154 are generated. The keyword index 150, content index 152, and session index 154 may be generated as explained above. When images are added or deleted from the plurality of images 140, then the keyword index 150, content index 152, and session index 154 may need to be updated to reflect the change to the composition of the plurality of images 140. Once a particular index is created, the index may be used by server 120 in processing any received requests after the creation of the index, i.e., the index need only be created once, and need not be recreated upon receipt of each request for a set of digital images.

After the keyword index 150, content index 152, and session index 154 have been generated, processing proceeds to step 320.

In step 320, request data that requests one or more requested images is received from client 110. The request data may be sent from client 110 using a variety of different mechanisms. For example, client 110 may display an interface, such as a webpage, through which a user may configure and sent the request data to server 120. In an embodiment, the request data may request one or more requested images that are each (a) associated with one or more keywords, and (b) are similar to that of a base image identified by the request data. After the request data is received by server 120, processing proceeds to step 330.

In step 330, one or more potential images are determined by server 120. The motivation of step 330 is to generate one or more potential images which may satisfy the search criteria specified in the request data received in step 320. The one or more potential images are identified as such because they have been identified as potentially satisfying the search criteria contained in the request data received in step 330; however, further processing shall be performed, as explained in detail below, to identify which images, within the one or more potential images, best satisfy the search criteria.

In an embodiment, potential images may be identified by, for each keyword identified in the request data, accessing an entry of the keyword index 150 to determine which images, of the plurality of images 140, are associated with the keyword. For example, in the request data identifies two keywords, then the keyword index 150 is accessed twice to determine those images, of the plurality of images 140, which are associated with either of the two keyword images. In this embodiment, any image in the plurality of images 140 that is associated with any one of the keywords identified in the request data is considered to be one of the one or more potential images. In an alternative embodiment, server 120 may be configured by administrative console 160 such that to qualify as one of the one or more potential images, if request data identifies two or more keywords, then the potential image must be associated with each keyword identified by the request data.

In an embodiment, if the request data did not expressly contain any keywords, but does identify a base image, then server 120 may access keyword data to generate a set of one or more keywords that are associated with the base image. In this way, the server 120 may determine the one or more potential images in step 330 using the keyword index 150, as explained above, even if the request data does not expressly identify any keywords. In such an approach, the base image identified in the request data must be a member of the plurality of images 140 or otherwise known to system 100, to enable the system 100 to have previously stored keyword data for the base image.

In an embodiment, to expedite the processing of step 330, images, in the plurality of images 140, may be removed from consideration to be included within the set of one or more potential image if the image fails to meet certain search criteria specified in the request data. For example, if the request data indicates that only photographs are desired, then any images in the plurality of images 140 which are not photographs need not be considered for inclusion in the one or more potential images. Thus, in an embodiment, the plurality of images 140 may be processed to eliminate from consideration for inclusion in the one or more potential images those images having image attributes (for example, whether the image is a photograph or a graphic) inconsistent with the search criteria. This approach may be used as a standalone approach for generating the one or more potential images, or it may be used in combination with one of the approaches described herein for generating the one or more potential images in an expedited manner.

In an embodiment, the determination of the one or more potential images, in step 330, may include the server 120 referencing the session index 154 to determine a set of images which users viewed together with the base image in a single session. The set of images, identified by the session index 154, may be considered for inclusion in the one or more potential images by the server 120. The weight given to images identified by the session index 154 by the server 120 when determining whether to include images, identified in the manner, in the one or more potential images may be configured using the administrative console 160.

After the one or more potential images are determined in step 330, processing proceeds to step 340.

In step 340, content data that reflects content attributes of the base image is obtained. If the base image is known to the server 120, then the server 120 may access information about the content attributes of the base image. For example, an entry in the content index 152 may be associated with the base image. In such a case, the server 120 may access the entry of the content index 152 associated with the base image to obtain content data for the base image in step 340.

In another embodiment, the server 120 may perform step 340 may perform analysis on the base image to produce the content data. Such an embodiment may be advantageous if the base image is not known to the server 120, e.g., the content index 152 does not have an entry associated with the base image. The analysis performed on the base image to produce the content data may include any of the lower level image operations 250 or any of the higher level image operations 252 depicted in FIG. 2, as well as any other image operation not depicted in FIG. 2. As a result of performing step 340, content data is determined, which shall be used by server 120 in comparing the content attributes of the base image to the content attributes of the one or more potential images. After the performance of step 340, processing proceeds to step 350.

In step 350, the one or more requested images (which were requested by the request data) are determined. In an embodiment, initially the server 120 removes from the one or more potential images any images that do not satisfy search criteria specified in the request data. For example, if the search criteria specified images with certain characteristics (e.g., the images are to be graphics or associated with a particular category), then all images in the one or more potential images that do not satisfy the search criteria may be removed from further consideration.

In an embodiment, for each image in the one or more potential images, the content data reflecting the content attributes of the base image is compared to the image description data associated with each entry of the content index 152. As a result of this determination, a determination of how similar the visual appearance of each image, in the one or more potential images, is to the visual appearance of the base image is obtained.

In an embodiment, as a result of determining how similar the visual appearance of the base image is to each of the one or more potential images, a ranking of the one or more potential images may be determined based on how similar the visual appearance each of the one or more potential images are to the visual appearance of the base image. A portion of the ranked one or more potential images may be selected as one or more requested images. For example, the server 120 may be configured to select a certain percentage (e.g., the top 20%) of the ranked one or more potential image to use as the one or more requested images (i.e., those images that satisfy the search criteria specified in the request data). The server 120 may also be configured to select a certain number of the ranked one or more potential image to use as the one or more requested images, e.g., the server may select the top 50 images of the ranked one or more potential images as the one or more requested images. As another example, the server 120 may be configured to select the one or more potential images by identifying a set of images whose similarity to the base image exceeds a certain threshold. In this way, the number of one or more potential images identified by the server 120 may vary in number, from request to request, based on the characteristics of the base image identified by a particular request.

In an embodiment, the session index 154 may also be used in the performance of step 350. The session index 154 may be used to (a) add a new image to the one or more potential images, (b) remove an existing image from the one or more potential images, or (c) modify how much weight is assigned to content attributes used in comparing a particular potential image to the base image.

After the one or more requested images have been determined, then in step 360 the server 120 transmits, to the client 110, response data that identifies the one or more requested images. In an embodiment, the request data may also include the one or more requested images.

Embodiments of the invention provided a unified approach for responding to requests for digital images based on a variety of information available. For example, the server 120 may consider any combination of information available in processing requests for digital images, such as (a) any keywords submitted by the user, (b) the content attributes of a base image, and/or (c) what digital images users have viewed in a session in processing requests for digital images. Embodiments of the invention provide for the server 120 responding to requests for digital images from client 110 faster than prior approaches.

Embodiments of the invention may be employed with a variety of different numbers of digital images in the plurality of images 140. For example, some embodiments may have a large number of images in the plurality of images 140, while other embodiments may have a small number of images in the plurality of images 140. Thus, the techniques of the embodiments discussed herein may scale to accommodate any number of digital images in the plurality of images 140.

Using Categories to Enhance Image Retrieval

An approach for performing image categorization 230 image operations shall be discussed. A digital image may be associated, by system 100, with a category that describes the visual content of the digital image. Embodiments of the invention may use categories in the performance of the steps of FIG. 3. While the nature or scope of a particular category may be arbitrarily chosen, the intent is to select a category that encompasses more than a just a few images of the plurality of images 140. For example, illustrative examples of a category of images that may be employed by embodiments of the invention include: whether the image depicts content indoors, whether the image depicts content outdoors, whether the image depicts any human figures, whether the image depicts any text, whether the image is a photograph or a graphic, and a predominant color of the image.

The weight assigned to content attributes when comparing digital images may vary based upon the category of the base image. For example, in an embodiment, in the performance of step 350 of FIG. 3, the server 220 may also determine a particular category for the base image. For example, assume that the base image is associated with a category of images that depict human figures. The weight assigned to the various content attributes of the base image may reflect that the base image is associated with a category of images that depict human figures, e.g., the result of the color analysis 222 image operation may be given more weight than the texture analysis 224 image operation. In this way, digital images of a certain category may be compared using more meaningful comparisons because the weight assigned to the content attributes of the images is based on the category of the images, and therefore is more appropriate for the particular type of images being compared. The weight assigned to content attributes of a particular image category by server 120 may be configured using administrative console 160.

For example, an administrator may use administrative console 160 to access server 120 to retrieve a current set of weights used in comparing the content attributes of images in category A. Currently, ten content attributes are given equal weight when comparing images in category A. The administrator may use administrative console 160 to change the weights applied to each of the ten content attributes, e.g., the result of comparing content attribute 1 may be given 30% of the decision, the result of comparing content attribute 2 may be given 20% of the decision, the result of comparing content attribute 3 may be given 10% of the decision, the result of comparing content attribute 3 may also be given 10% of the decision, and the results of comparing content attributes 5-10 may each be given 5% of the decision. Such a change may be desirable if content attribute 1 is the most important content attribute when comparing digital images of category A, content attribute 2 is the second most important content attribute when comparing digital images of category A, etc. The above example is only one way in which the weights applied to digital image content attributes during the comparison of digital images may be expressed, as other embodiments may change the weight given to specific content attributes of a digital image during comparison of the digital image to other digital images in a variety of other ways.

Further, when the server 120 determines the one or more potential images in step 330, the server 120 may initially eliminate any images, in the plurality of images 140, which are not associated with the same category as the base image.

Comparing Digital Images Using Color

Figure 4:
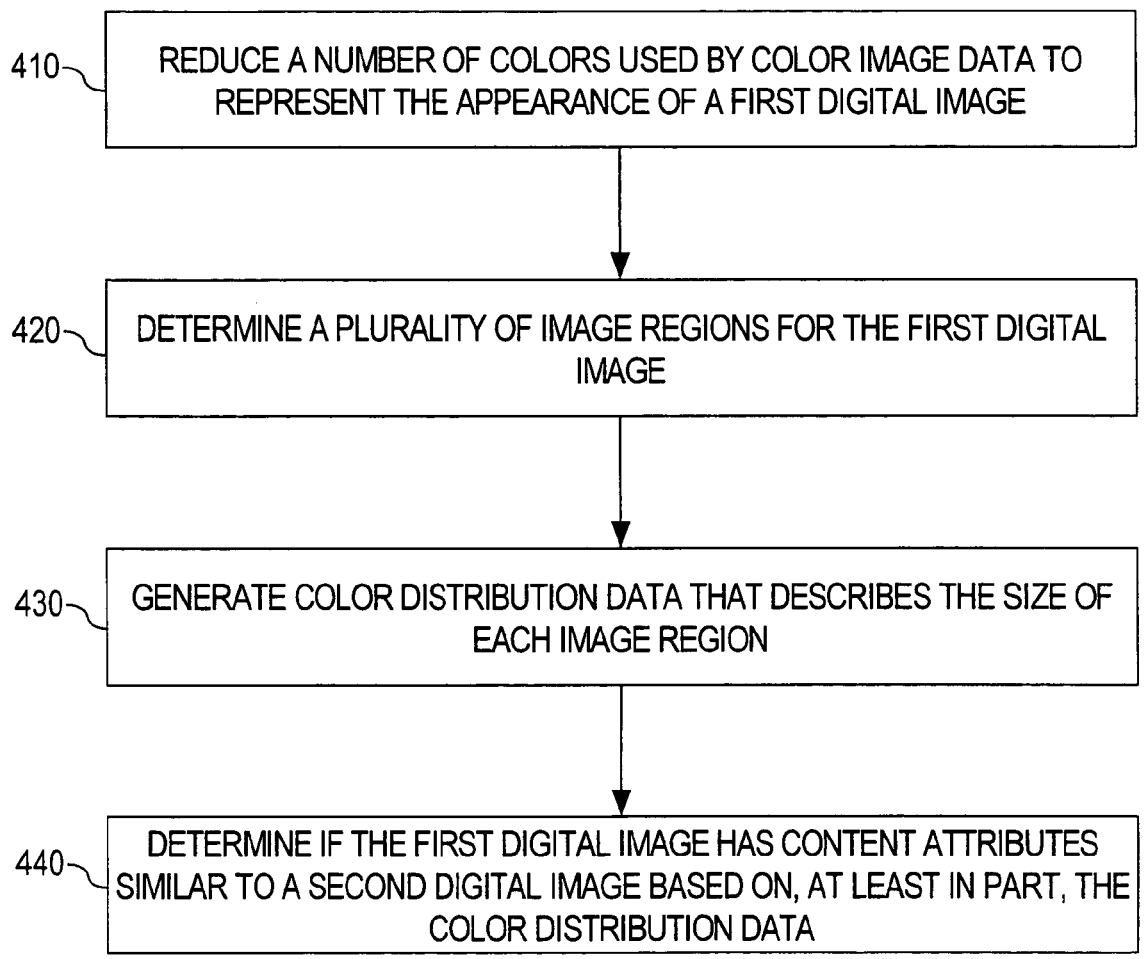
FIG. 4 is a flowchart illustrating the functional steps in generating content attributes of digital images and comparing those attributes according to a first embodiment of the invention.

Techniques for performing color analysis 222 according to embodiments of the invention shall be discussed. FIG. 4 is a flowchart illustrating the functional steps in generating content attributes of digital images and comparing those attributes according to a first embodiment of the invention. Some embodiments may perform the steps of FIG. 4 using an index. For example, steps 410, 420, and 430 may be used in generating an entry of the content index 152, or a portion of the entry of the content index 152, and step 440 may be performed by using the content index 152. Thus, the performance of steps 410, 420, and 430 may be used to generate a particular entry, or a portion of an entry, in content index 152.

Other embodiments of the invention, as described in further detail below, may perform the steps of FIG. 4 without the use of the content index 152. For example, if the base image is not known to server 120 (e.g., the content index 152 does not have an entry associated with the base image), then the server 120 may analyze the base image by performing steps 410, 420, and 430 to determine color distribution data for the base image, and thereafter compare the base image to one or more potential images in the performance of step 440.

In step 410, the number of colors used by color image data to represent the visual appearance of a first digital image may be reduced. A digital image is the visual representation of image data. Image data, similarly, is data that describes how to render a representation of an image. As used herein, color image data is data that describes how to render a color representation of an image. For example, non-limiting, illustrative examples of color image data include a GIF file, a JPG file, a PDF file, a BMP file, a TIF file, a DOC file, a TXT file, and a XLS file.

The typical digital image shown on a web page uses 256 different color levels to express how much red, blue, and green color comprise the color displayed by a particular pixel displaying a portion of the digital image. This results in a large set of colors levels used by the color image data (256× 256×256=16,777,216 colors) to represent the color of the digital image. Thus, in step 410, if the number of colors levels used by the color image data to represent the color digital image are higher than a threshold level, the number of color levels used by the color image data to represent the color digital image is reduced.

For example, four color levels, instead of 256 color levels, may be used to express how much red, blue, and green color comprise the color displayed by a particular pixel displaying a portion of the digital image. The color shown by a pixel is quantized to one of the colors in the reduced color set. For example, if fours color levels are used to express how much red, blue, and green color comprise the color displayed by a particular pixel displaying a portion of the digital image, the reduced color set is 64 color levels (4×4×4=64 colors). After the performance of step 410, the color image data will use only 64 color levels to express the color shown by each pixel displaying a portion of the digital image.

Note that if the color image data already uses a number of colors less than the threshold level to represent the color image, then the performance of step 410 need not be performed. After the performance of step 410, processing proceeds to step 420.

In step 420, a plurality of image regions for the first digital image are determined. Each image region, of the plurality of image regions, corresponds to a region of the digital image that displays a particular color in the reduced color set. For example, if fours colors are used to express how much red, blue, and green color comprise the color displayed by a particular pixel displaying a portion of the digital image, then there will be up to 64 different image regions for the first digital image. The plurality of image regions for the first digital image may be determined using connected component analysis, a technique known to those in the art.

Image regions associated with a particular color in the reduced color set may be comprised of two or more non-contiguous subregions. Note that if a particular color in the reduced color set is not used by the color image data to represent the color digital image, then that particular color will not be associated with an image region.

To illustrate, consider FIG. 5, which is a diagram illustrating an original digital image and a plurality of image regions determined for the original digital image according to an embodiment of the invention. Note that FIG. 5 is not depicted in color, so certain image regions may appear depicted in similar gray scale tones. Each of the plurality of image regions depicted in FIG. 5 is associated with a particular color in the reduced color set. For example, image region 502 may be associated with color A in the reduced color set, image region 504 may be associated with color B in the reduced color set, and image region 506 may be associated with color C in the reduced color set. Thus, color image data indicates that color A is to be used when rendering the display of digital image 500 at image region 502 using the reduced color set, and color image data indicates that color B is to be used when rendering the display of digital image 500 at image region 504 using the reduced color set. After an image region of the first digital image has been determined for each color in the reduced color set, processing proceeds to step 430.

In step 430, color distribution data that describes a size of each image region is generated. Color distribution data may describe the size of each image region in a variety of different ways. In an embodiment, color distribution data describes at least the mean and variance of the size of each image region of digital image 500. In an embodiment, color distribution data does not reflect the spatial position of any image region in the digital image.

The color distribution data, as explained above, may be used to describe the content attributes of the base image in an entry of the content index 152. Thus, the performance of steps 410-430 may be performed in step 310 of FIG. 3. Alternatively, color distribution data may be generated dynamically for a particular base image if no entry of the content index 152 does not currently describes the content attributes of the base image. After color distribution data has been generated for the first digital image, processing proceeds to step 440.

In step 440, a determination is made as to whether the first digital image is similar in visual appearance to a second digital image based on, at least in part, the color distribution data. In an embodiment, the color distribution data (denoted first color distribution data) describing the size of each image region of a first digital image may be compared to color distribution data (denoted second color distribution data) describing the size of each image region of a second digital image. The determination of whether the first digital image is similar to the second digital image may be performed by comparing the first color distribution data to the second color distribution data.

The determination of step 440 may be performed using content index 152. For example, if the base image is known to server 120, server 120 may access an entry of the content index 152 to obtain first color distribution data for the first digital image. The server 120 may also access entries of the content index 152 to obtain second color distribution data for each of the second digital images.

In this way, a base image (the image referenced in the request data) may be analyzed as described above with reference to FIG. 4 to generate color distribution data for the base image. Each entry of the content index 152 may store color distribution data for the particular digital image, in the plurality of digital images 140, associated with the entry. Thus, the content index 152 may be referenced for each image in the one or more potential images (determined in step 330) to determine which of the one or more potential images are similar to the base image.

The determination of step 440 may be performed without using content index 152. For example, if the content index 152 does not have an entry for the base image, the server 120 may perform the steps 410-430 to dynamically analyze the base image to determine color distribution data for the first digital image. Similarly, if the content index 152 does not have an entry for any digital images in the set of potential images, then server 120 may dynamically analyze that potential image to generate second color distribution data for the potential image by performing the steps 410-430 on the potential image.

In an embodiment, the comparison of the first color distribution data to the second color distribution data may be performed using a modified version of the Bhattacharyya distance measure, which is described in further detail below. As a result of comparing the color distribution data of a base digital image to the color distribution data of the one or more potential images, a ranking that expresses a relative similarity between the base digital image to the one or more potential digital images may be determined. This is so because the modified version of the Bhattacharyya distance measure provides a measure of the relative similarity between two color digital images when color distribution data for the two color digital images is compared using the modified version of the Bhattacharyya distance measure.

Detemining How Similar Images are to One Another

In an embodiment, the determination by system 100 in step 440 in FIG. 4 of how similar the visual appearance of two digital images are to each other may be performed by comparing the content attributes of the base image to the content attributes of the potential image. For example, the color distribution data associate with a base image may be compared to the color distribution data of a potential image. Such a comparison may be performed using a modified version of the Bhattacharyya distance measure.

Using the modified version of the Bhattacharyya distance measure, how different the color distribution is between two images may be calculated as the summation of the dissimilarities between the variances of the plurality of image regions sizes in the two images. The modified Bhattacharyya distance measure may be expressed as:

$$D(I_k, I_l) = \sum_{i=1}^{N} D_i(I_k, I_l)$$

where

-continued
$$D_i(I_k, I_l) = \frac{1}{4} \frac{(\mu_{ik} - \mu_{il})^2}{\sigma_{ik}^2 + \sigma_{il}^2} + \frac{1}{2} \ln\left[\frac{\frac{1}{2}(\sigma_{ik}^2 + \sigma_{il}^2)}{\sqrt{\sigma_{ik}^3 \sigma_{il}^2}}\right]$$

In the above expression, $(\mu_{ik}, \sigma^2_{ik})$ and $(\mu_{il}, \sigma^2_{il})$ are the mean-variance pairs for the i-th color of digital images $I_k$ and $I_l$ respectively. In the second expression listed above, the first term in the summation on the right hand side is the distance between the mean sizes of the image regions normalized by the variances, while the second term on the summation is a measure of the dissimilarity between the variances of the sizes of the image regions. The first expression listed above may be used to determine the relative difference between the two digital images by calculating the sum of the distances (or differences) due to all the individual colors of the digital images.

The modified version of the Bhattacharyya distance measure may also be used when comparing other content attributes of two or more images in the performance of step 350 in FIG. 3.

Applications of Comparing Digital Images Using Color

Embodiments of the invention employing the techniques depicted in FIG. 4 may be used to determine if one or more colors are predominant in the subject matter depicted in an digital image. If a user wishes to search for a digital image that has a predominant color, such as a digital image of a purple flower or a red sports car, then the techniques for performing color analysis 222 discussed above may be used to determine if a digital image depicts subject matter in that color. In this way, when the server 120 performs step 350 of FIG. 3, the server 120 may consider whether a digital image, in the plurality of images 140, is similar in visual appearance to the base image by determining whether the digital image being considered depicts the same predominant color as the base image.

Similarly, embodiments of the invention may perform face/skin detection 228 by performing the steps 410, 420, and 430 of FIG. 4 on the digital image, and thereafter determining whether a digital image has image regions, associated with skin color, of a certain size or greater. If a digital image does have image regions associated with skin color of a certain size or greater, then the server 120 may conclude that the digital image may depict human skin, because a large portion of the digital image depicts subject matter with the same color as skin tones.

Embodiments of the invention may also use the above techniques to perform offensive content detection. Specifically, if system 100 detects the presence of skin in a digital image by determining if the digital image has image regions associated with skin color of a certain size or greater, then the system 10 may determine that the digital image may display offensive content, such as adult or pornographic content. This is so because a large portion of the digital image depicts subject matter with skin color, which is a strong indicator of offensive content.

Comparing Digital Images Using Texture

Figure 6:
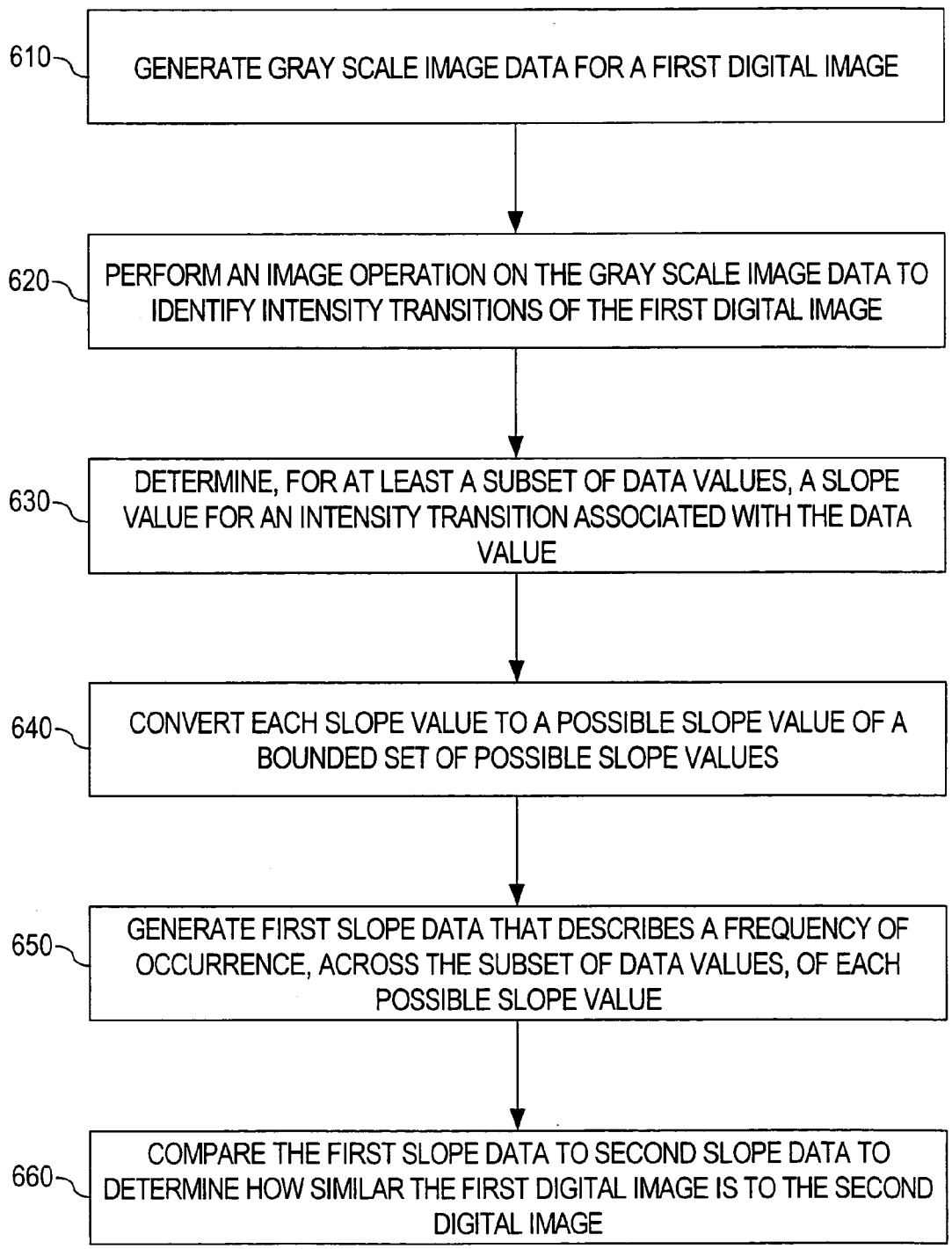
FIG. 6 is a flowchart illustrating the functional steps of comparing digital images according to a second embodiment of the invention.

Techniques for performing texture analysis 224 according to embodiments of the invention shall be discussed. FIG. 6 is a flowchart illustrating the functional steps of comparing digital images according to an embodiment of the invention. The functional step of FIG. 6 may be used to compare two or more digital images based on the distribution of texture in the images. Some embodiments may perform the steps of FIG. 6 using an index. For example, steps 610-650 may be used in generating an entry of the content index 152, or a portion of the entry of the content index 152, and step 650 may be performed by using the content index 152. Thus, the performance of steps 610-650 may be used to generate a particular entry, or a portion of an entry, in content index 152.

Other embodiments of the invention, as described in further detail below, may perform the steps of FIG. 6 without the use of the content index 152. For example, if the base image is not known to server 120 (e.g., the content index 152 does not have an entry associated with the base image), then the server 120 may analyze the base image by performing steps 610-650 to determine slope data for the base image.

In step 610, gray scale image data is generated for a first digital image. Gray scale image data is a digital representation of a gray scale image. The gray scale image data comprises a set of data values. Each data value may be used in rendering the display of the digital image represented by the gray scale image data, at a particular location, such as a pixel. Each data value comprised in the gray scale image data identifies a gray scale value of a sequence of gray scale values. For example, the sequence of gray scale values may run from 0 (indicating absolute black) to 255 (indicating absolute white). Gray scale values between 0 and 255 may indicate a relative shade of gray, i.e., values closer to 0 are darker, whereas values closer to 255 are lighter.

The generation of gray scale image data in step 610 may be performed using digital image manipulation software application, such as Adobe Photoshop, available from Adobe Systems, Inc. of San Jose, Calif. FIG. 7A is a first illustration of two gray scale digital images according to an embodiment of the invention. After the performance of step 610, processing proceeds to step 620.

In step 620, an image operation is performed on the gray scale image data to identify intensity transitions of the first digital image. The motivation of performing step 620 is to identify regions, of the gray scale image represented by the gray scale image data, which undergo a rapid change in intensity. Identifying intensity transitions of digital images may be performed by edge & orientation analysis 212. Numerous types of edge analysis may be performed to identify intensity transitions of digital images, such as, but not limited to, a Laplacian of the Gaussian image operation, a Sobel image operation, and a Canny image operation.

FIG. 7B is an illustration of gray scale digital images after the performance of step 620. As shown in FIG. 7B, areas of images A and B in FIG. 7A that correspond to an intensity transformation are illustrated in white in FIG. 7B. After the performance of step 7B, processing proceeds to step 630.

In step 630, for at least a subset of the data values of the gray scale image data, a slope value is determined for an intensity transition associated with the data value. As intensity transitions are identified based on a change in intensity from a first region to a second region, intensity transitions, by their nature, correspond to the edge (or boundary) between different regions of intensity. For example, the intensity transitions shown in the digital images depicted in FIG. 7B appear as white lines running across the digital image in various directions. For those data values of the gray scale image data that are associated with an intensity transition, the slope of the intensity transition is determined.

Some data values of the gray scale image data may not be associated with an intensity transition, in which case the data values are not associated with a slope value in step 630. Also, embodiments of the invention may analyze less than the entire digital image; as a result, less than all of the data values of the gray scale image data may be processed in step 630. After the performance of step 630, processing proceeds to step 640.

In step 640, the slope value, associated with each data value in the subset of data values, is converted to a possible slope value of a bounded set of possible slope values. For example, embodiments of the invention may employ a bounded set of 32 possible slope values. Thus, for each slope value determined in step 630, the slope value must be converted into one of the 32 possible slope values. The motivation for performing step 640 is to reduce the amount of slope values used to determine the intensity transitions at each data value to assist the subsequent comparison of digital images. While in the above example a bounded set of 32 possible slope values were discussed, other embodiments of the invention may employ any reasonable number of possible slope values. After the performance of step 640, processing proceeds to step 650.

In step 650, first slope data that describes a frequency of occurrence across the subset of data values, of each possible slope value, is generated. For example, if there are 32 possible slope values, then in step 650, a frequency of occurrence across the subset of data values for each of the 32 possible slope values is determined. The frequency of occurrence may be expressed as a count of all the data values, of the subset of data values, associated with each possible slope value. Embodiments of the invention may generate a histogram that describes the frequency of each possible slope value in the subset of data values.

Embodiments of the invention may normalize the slope data to discount the size of the digital image. For example, the histogram may be normalized by expressing the frequency of each possible slope value as a percentage of a total number of data values in the subset of data values (such a histogram shall be denoted a "percent of total data values histogram").

FIG. 7C is an illustration of slope data for the gray scale digital images of FIG. 7A according to an embodiment of the invention. The slope data of FIG. 7C reflects a set of 32 possible slope values. In the slope data of FIG. 7C, the number of data values associated with each possible slope value is listed in the slope data, separated by a semi-colon. For example, in example image A, there are 334 data values associated with possible slope value 1,325 data values associated with possible slope value 2,291 data values associated with possible slope value 3, etc.

FIG. 7D is an illustration of normalized slope data for the gray scale digital images of FIG. 7A according to an embodiment of the invention. The normalized slope data of FIG. 7D reflects a set of 32 possible slope values. In the normalized slope data of FIG. 7D, the percent of the total number of data values of a digital image associated with each possible slope value is listed in the slope data, separated by a semi-colon. For example, in example image A, 3.46% of the data values of example image A are associated with possible slope value 1, 3.36% of the data values of example image A are associated with possible slope value 2, 3.01% of the data values of example image A are associated with possible slope value 3, etc. After the performance of step 650, processing proceeds to step 660.

In step 660, the first slope data (generated in step 650) is compared to second slope data to determine how similar the first digital image is to a second digital image. In an embodiment, the comparison of step 660 may be performed using the Euclidean distance between the first slope data and the second slope data. For example, assume that a particular "percent of total data values" histogram is compared to 10 other "percent of total data values" histograms. The relative difference between the particular "percent of total data values" histogram to the 10 other "percent of total data values" histograms may be determined by calculating the Euclidean distance between the percentages of the total number of data values in each possible slope value depicted in the histograms.

In this way, digital images that are similar will have similar histograms. When the Euclidean distance between two histograms is small, then the digital images associated with those histograms are similar, and if the Euclidean distance between two histograms is large, then the digital images associated with those histograms are less similar. Thus, a relative determination of how similar two images are may be determined by comparing the Euclidean distance of their histograms.

Determining How Similar Images are to One Another Using Texture

In an embodiment, the determination of the one or more requested images by system 100 in step 350 of FIG. 3 may be performed by comparing the content attributes of the base image to the content attributes of one or more potential images. For example, the texture content attributes of the base image may be compared to the texture content attributes of a potential image. Such a comparison may be performed using the Euclidean distance measure. The Euclidean distance measure may also be used, by other embodiments of the invention, when comparing other content attributes of two or more images in the performance of step 440 in FIG. 4.

Applications of Analyzing the Texture of Digital Images

Embodiments of the invention may be employed to analyze the texture of a digital image. In an embodiment, the slope data for a digital image, generated in step 650 of FIG. 6, may be analyzed to determine the content attributes of the digital image associated with the slope data. For example, by performing steps 610-650 of FIG. 6, the texture of a digital image may be determined.

In another embodiment, a first digital image may be compared, in the performance of step 660 of FIG. 6, against a second digital image with a known texture. In this way, a determination may be made as to whether the first digital image depicts content with a texture similar to that of the second digital image with the known texture.

In an embodiment, the texture of a digital image may be analyzed as described above to determine if the digital image depicts a certain type of terrain or a certain type of crop. For example, such an embodiment may be employed with digital images taken from a satellite or other mechanism from a high level or birds-eye perspective. Other types of analysis, such as gradient orientation histogram analysis, may be performed in combination with the approach of FIG. 6.

In other embodiments of the invention, the texture of a digital image may be analyzed as described above to determine if the digital image depicts human skin, as human skin is smooth and has a very low texture. If a digital image depicts a large enough portion of human skin, the embodiments of the invention may determine that the digital image depicts offensive or adult content, such as one or more nude human figures. The system 100 may be configured to provide an offensive content probability value, which indicates how likely it is that a particular image depicts offensive or adult content. The offensive content probability value may be determined by a ratio of the amount of content of the digital image that is human skin vs. the amount of the content of the digital image that is not human skin.

Implementing Mechanisms

Figure 8:
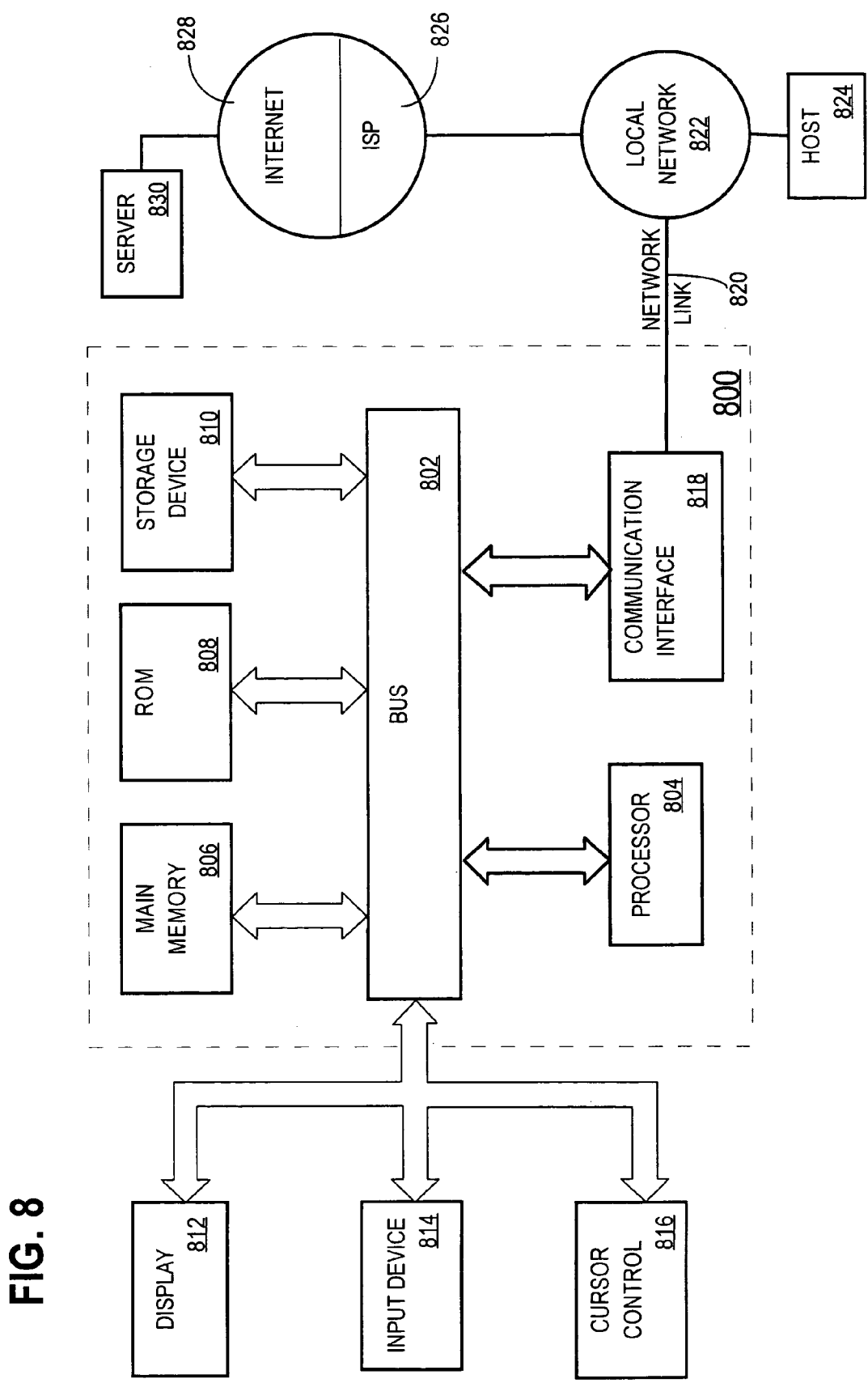
FIG. 8 is a block diagram that illustrates a computer system upon which an embodiment of the invention may be implemented.

In an embodiment, client 110, server 120, and storage 130 may each be implemented on a computer system. FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is Claimed is:

1. A method for analyzing digital images, comprising:
performing an image operation on gray scale image data to identify intensity transitions of a first digital image, wherein the gray scale image data is a digital representation of a gray scale version of the first digital image, and wherein the gray scale image data comprises a set of data values, wherein each data value of the set of data values identifies a gray scale value of a sequence of gray scale values;
determining, for at least a subset of data values, in the set of data values, a slope value for an intensity transition associated with the data value;
converting the slope value, associated with each data value in the subset of data values, to a possible slope value of a bounded set of possible slope values; and
generating first slope data, for the first digital image, that describes a frequency of occurrence, across the subset of data values, of each possible slope value, of the bounded set of possible slope values;
wherein at least the steps of determining, converting and generating are performed by at least one computing device.

2. The method of claim 1, further comprising:
comparing the first slope data to second slope data associated with a second digital image to determine how similar the first digital image is to the second digital image.

3. The method of claim 2, wherein comparing the first slope data to second slope data comprises determining the Euclidean distance between the first slope data and the second slope data.

4. The method of claim 1, further comprising:
generating the gray scale image data based on color image data, wherein the color image data is a digital representation of a color version of the first digital image.

5. The method of claim 1, wherein the image operation is one of: a Laplacian of the Gaussian image operation, a Sobel image operation, and a Canny image operation.

6. The method of claim 1, wherein generating the first slope data comprises:
generating a histogram that describes a frequency of each possible slope value, in the bounded set of possible slope values, in the subset of data values;
normalizing the histogram by expressing the frequency of each possible slope value as a percentage of a total number of data values in the subset of data values.

7. The method of claim 1, further comprising:
analyzing the first slope data to determine whether the first digital image depicts either a certain type of terrain or a certain type of crop.

8. The method of claim 1, further comprising:
analyzing the first slope data to determine whether the first digital image depicts human skin.

9. The method of claim 1, further comprising:
analyzing the first slope data to determine whether the first digital image depicts offensive content.

10. A computer-readable volatile or non-volatile storage medium storing instructions for analyzing digital images, wherein processing of the instructions by one or more processors causes:
performing an image operation on gray scale image data to identify intensity transitions of a first digital image,
wherein the gray scale image data is a digital representation of a gray scale version of the first digital image, and
wherein the gray scale image data comprises a set of data values, wherein each data value of the set of data values identifies a gray scale value of a sequence of gray scale values;
determining, for at least a subset of data values, in the set of data values, a slope value for an intensity transition associated with the data value;
converting the slope value, associated with each data value in the subset of data values, to a possible slope value of a bounded set of possible slope values; and
generating first slope data, for the first digital image, that describes a frequency of occurrence, across the subset of data values, of each possible slope value, of the bounded set of possible slope values.

11. The computer-readable volatile or non-volatile storage medium of claim 10, wherein processing of the instructions by the one or more processors further causes:
comparing the first slope data to second slope data associated with a second digital image to determine how similar the first digital image is to the second digital image.

12. The computer-readable volatile or non-volatile storage medium claim 11, wherein comparing the first slope data to second slope data comprises determining the Euclidean distance between the first slope data and the second slope data.

13. The computer-readable volatile or non-volatile storage medium claim 10, wherein processing of the instructions by the one or more processors further causes:
generating the gray scale image data based on color image data, wherein the color image data is a digital representation of a color version of the first digital image.

14. The computer-readable volatile or non-volatile storage medium claim 10, wherein the image operation is one of: a Laplacian of the Gaussian image operation, a Sobel image operation, and a Canny image operation.

15. The computer-readable volatile or non-volatile storage medium of claim 10, wherein generating the first slope data comprises:
generating a histogram that describes a frequency of each possible slope value, in the bounded set of possible slope values, in the subset of data values;
normalizing the histogram by expressing the frequency of each possible slope value as a percentage of a total number of data values in the subset of data values.

16. The computer-readable volatile or non-volatile storage medium of claim 10, wherein processing of the instructions by the one or more processors further causes:
analyzing the first slope data to determine whether the first digital image depicts either a certain type of terrain or a certain type of crop.

17. The computer-readable volatile or non-volatile storage medium of claim 10, wherein processing of the instructions by the one or more processors further causes:
analyzing the first slope data to determine whether the first digital image depicts human skin.

18. The computer-readable volatile or non-volatile storage medium of claim 10, wherein processing of the instructions by the one or more processors further causes:
analyzing the first slope data to determine whether the first digital image depicts offensive content.

19. An apparatus for analyzing digital images, the apparatus comprising:
a computer-readable storage medium storing instructions ;and
one or more processors, wherein processing of the instructions by the one or more processors causes:
performing an image operation on gray scale image data to identify intensity transitions of a first digital image,
wherein the gray scale image data is a digital representation of a gray scale version of the first digital image, and
wherein the gray scale image data comprises a set of data values, wherein each data value of the set of data values identifies a gray scale value of a sequence of gray scale values;
determining, for at least a subset of data values, in the set of data values, a slope value for an intensity transition associated with the data value;
converting the slope value, associated with each data value in the subset of data values, to a possible slope value of a bounded set of possible slope values; and
generating first slope data, for the first digital image, that describes a frequency of occurrence, across the subset of data values, of each possible slope value, of the bounded set of possible slope values.

20. The apparatus of claim 19, wherein processing of the instructions by the one or more processors further causes:
comparing the first slope data to second slope data associated with a second digital image to determine how similar the first digital image is to the second digital image.

21. The apparatus of claim 20, wherein comparing the first slope data to second slope data comprises determining the Euclidean distance between the first slope data and the second slope data.

22. The apparatus of claim 19, wherein processing of the instructions by the one or more processors further causes:
generating the gray scale image data based on color image data, wherein the color image data is a digital representation of a color version of the first digital image.

23. The apparatus of claim 19, wherein the image operation is one of: a Laplacian of the Gaussian image operation, a Sobel image operation, and a Canny image operation.

24. The apparatus of claim 19, wherein generating the first slope data comprises:
generating a histogram that describes a frequency of each possible slope value, in the bounded set of possible slope values, in the subset of data values;
normalizing the histogram by expressing the frequency of each possible slope value as a percentage of a total number of data values in the subset of data values.

25. The apparatus of claim 19, wherein processing of the instructions by the one or more processors further causes:
analyzing the first slope data to determine whether the first digital image depicts either a certain type of terrain or a certain type of crop.

26. The apparatus of claim 19, wherein processing of the instructions by the one or more processors further causes:
analyzing the first slope data to determine whether the first digital image depicts human skin.

27. The apparatus of claim 19, wherein processing of the instructions by the one or more processors further causes:
analyzing the first slope data to determine whether the first digital image depicts offensive content.

* * * * *

UNITED STATES PATENT AND TRADEMARK OFFICE
CERTIFICATE OF CORRECTION

PATENT NO. : 7,583,839 B2
APPLICATION NO. : 11/316728
DATED : September 1, 2009
INVENTOR(S) : Shah et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 828 days.

Signed and Sealed this

Fourteenth Day of September, 2010

David J. Kappos
*Director of the United States Patent and Trademark Office*